Nov. 29, 1927.
B. C. COONS
1,650,694
SEED CELL REMOVING APPARATUS
Filed March 24, 1923
4 Sheets-Sheet 1
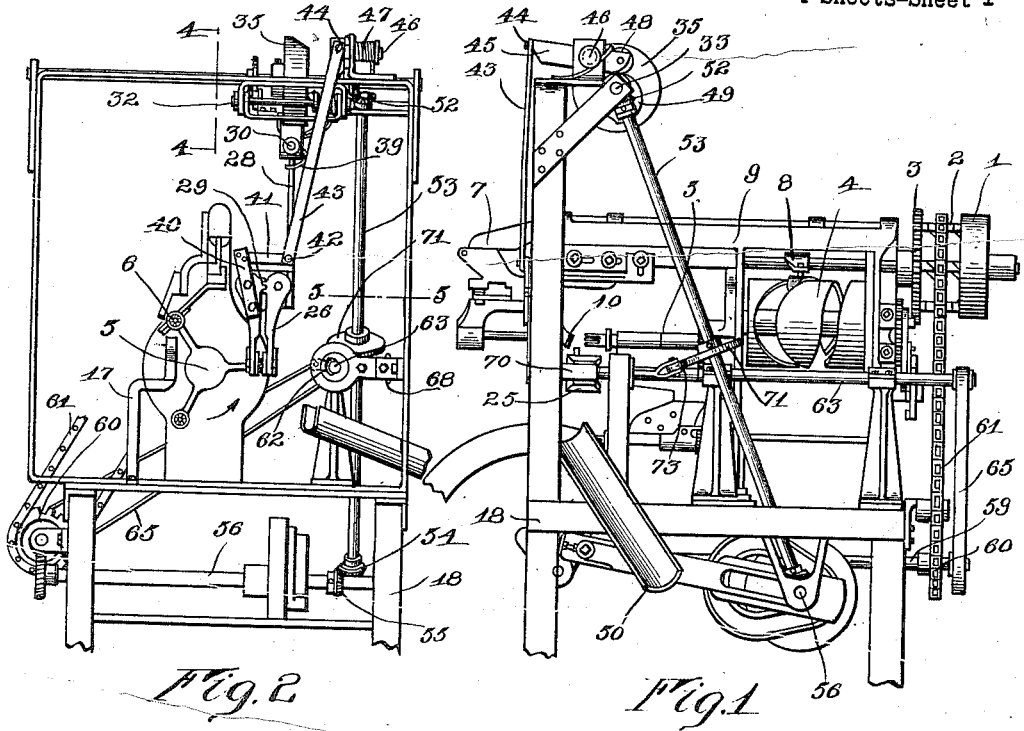
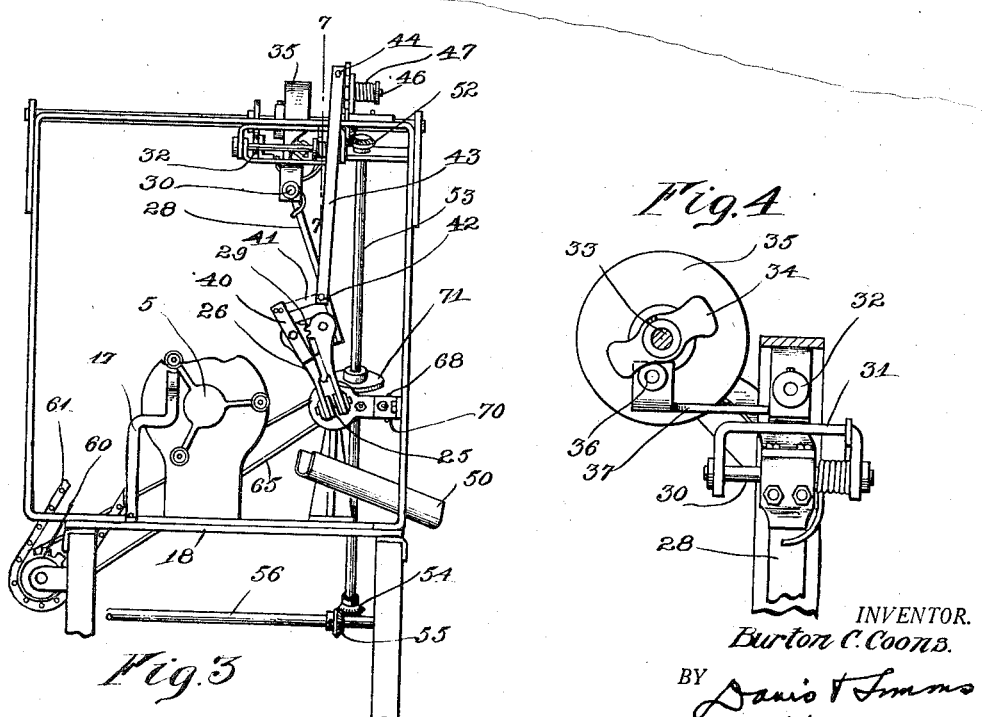
INVENTOR.
Burton C. Coons.
BY Davis & Simms
his ATTORNEYS.

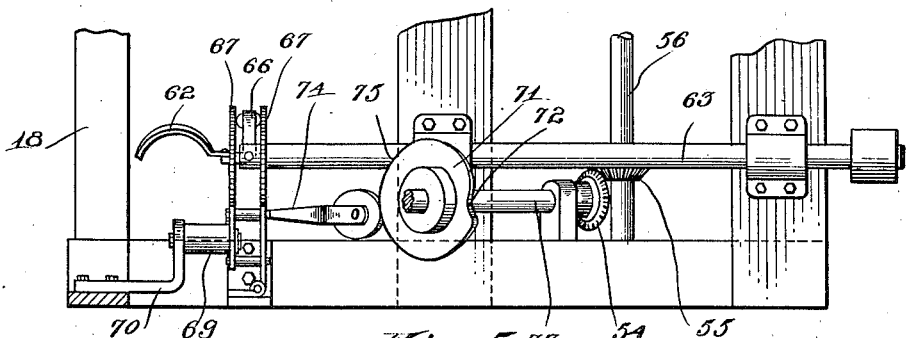
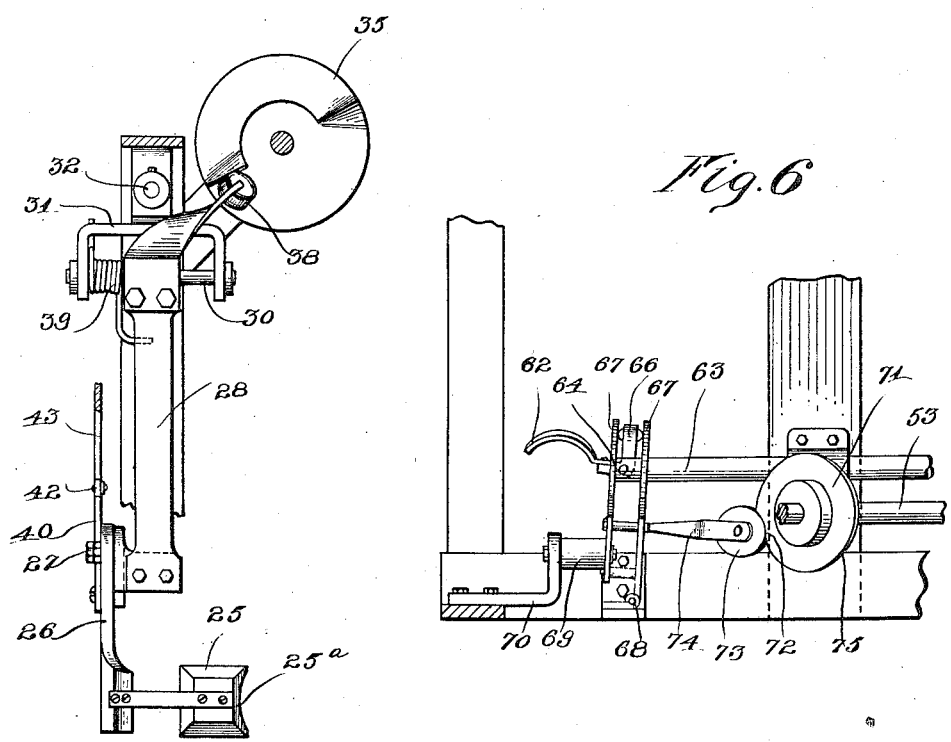

Nov. 29, 1927.

B. C. COONS 1,650,694

SEED CELL REMOVING APPARATUS

Filed March 24, 1923 4 Sheets-Sheet 3

INVENTOR.
Burton C. Coons.
BY Davis & Timmo
his ATTORNEYS.

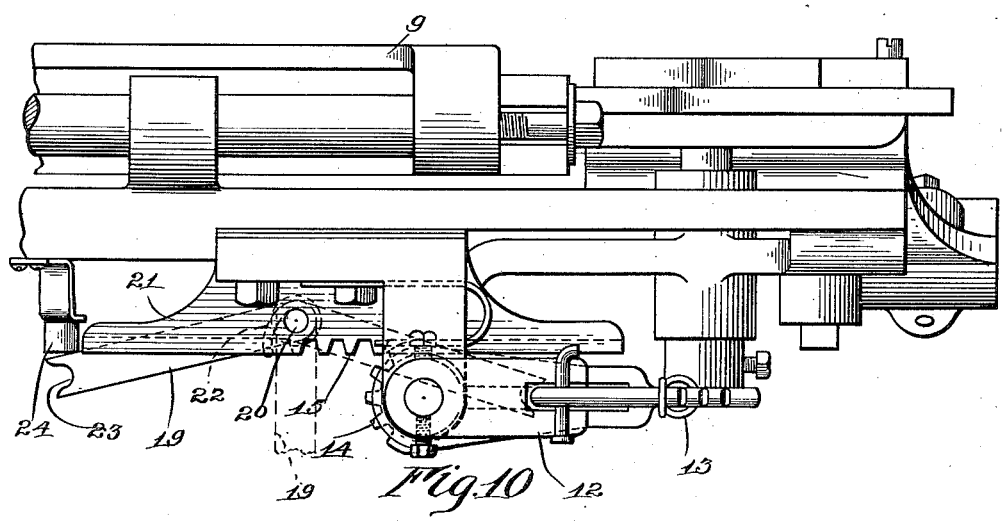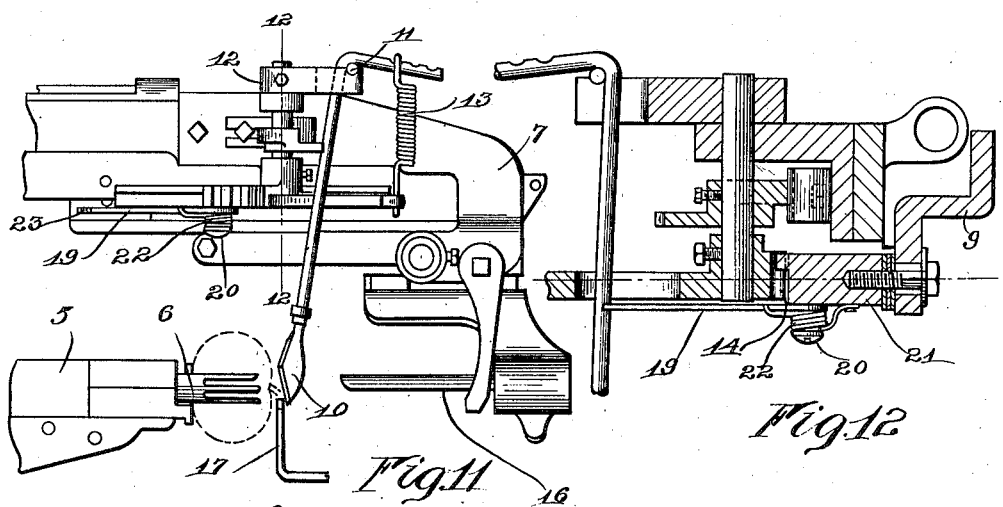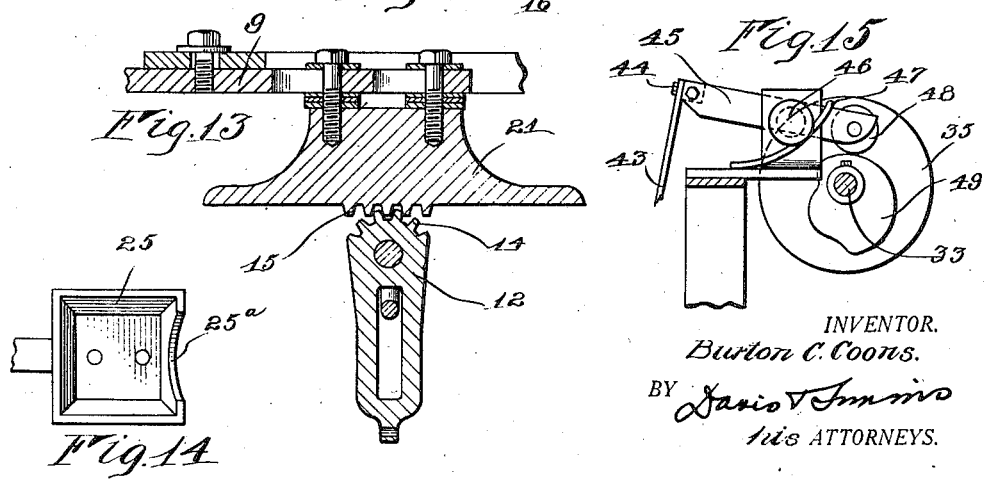

Patented Nov. 29, 1927.

1,650,694

UNITED STATES PATENT OFFICE.

BURTON C. COONS, OF ROCHESTER, NEW YORK, ASSIGNOR TO COONS MANUFACTURING COMPANY, INC., OF ROCHESTER, NEW YORK, A CORPORATION OF NEW YORK.

SEED-CELL-REMOVING APPARATUS.

Application filed March 24, 1923. Serial No. 627,355.

The present invention relates to a seed cell removing apparatus for removing the seeds of apples and like fruit, and an object of this invention is to provide a seed cell removing apparatus in which the fruit is held against turning by mechanical means in centered relation to a seed cell removing device, while the latter removes the seed cell from the fruit. Another object of the invention is to provide in connection with a rotary seed cell removing device, a holding means which does not turn with the device and which holds the fruit in centered relation with reference to the axis of turning of the rotary seed cell removing device. Still another object of the invention is to provide a centering and holding means for the fruit which will receive the fruit at any suitable point, center the same, and carry it to a position where the fruit will be acted upon by a seed cell removing device. A further object of the invention is to provide in combination with a paring mechanism and a seed cell removing device, a means which will transfer the fruit from the supporting device on which the fruit is pared to a position where the seed cell removing device will remove the seed cell from the pared fruit. Another and still further object of the invention is to combine with a paring machine of the type having a rotary reel carrying a plurality of forks, which are successively presented to the paring mechanism of the paring machine, a seed cell removing device, and mechanism for transferring the fruit from one of the forks of the rotary reel to a position where the seed cell removing device will act on the fruit to remove the seed cell. Another and still further object of the invention is to provide a paring machine with means which will cause the paring mechanism to move on its return motion, so that it does not engage the fruit on the fork of the paring machine, in order that the reel on which the fork is mounted may carry the fruit to a position where such fruit may be removed from the fork. A still further object of the invention is to provide in connection with a paring machine having a rotary reel with a plurality of forks successively presented to the paring mechanism and a seed cell removing device for removing the core from the fruit after it has been pared, a device which will prevent the coring device removing the fruit from the fork so that the reel may turn to carry the fruit to another position where such fruit may be removed from the reel.

To these and other ends, the invention consists of certain parts and combinations of parts, all of which will be hereinafter described: the novel features being pointed out in the appended claims.

In the drawings:

Fig. 1 is a side view of a machine constructed in accordance with this invention;

Fig. 2 is a front view showing the fruit being removed from one of the forks on which the paring takes place;

Fig. 3 is a view similar to Fig. 2 with parts removed, showing the fruit being presented to the seed cell removing device;

Fig. 4 is a section on the line 4—4, Fig. 2;

Fig. 5 is an enlarged fragmentary view of the seed cell removing device showing the manner in which the device may be operated;

Fig. 6 is a fragmentary view showing the seed cell removing device shifted to remove the seed cell;

Fig. 7 is a section on the line 7—7, Fig. 3;

Fig. 10 is an enlarged fragmentary view of the manner in which the knife of the paring mechanism is caused to swing out of the path of the fruit on the fork on the return movement of the knife;

Fig. 11 is a side view of the same parts on a smaller scale;

Fig. 12 is a section on the line 12—12, Fig. 11;

Fig. 13 is a section on the line 13—13, Fig. 12;

Fig. 14 is a face view of one of the cupped holding and centering members; and

Fig. 15 is a view of the cam which effects the opening and closing of the jaws of the holding and centering means.

Figure 8:
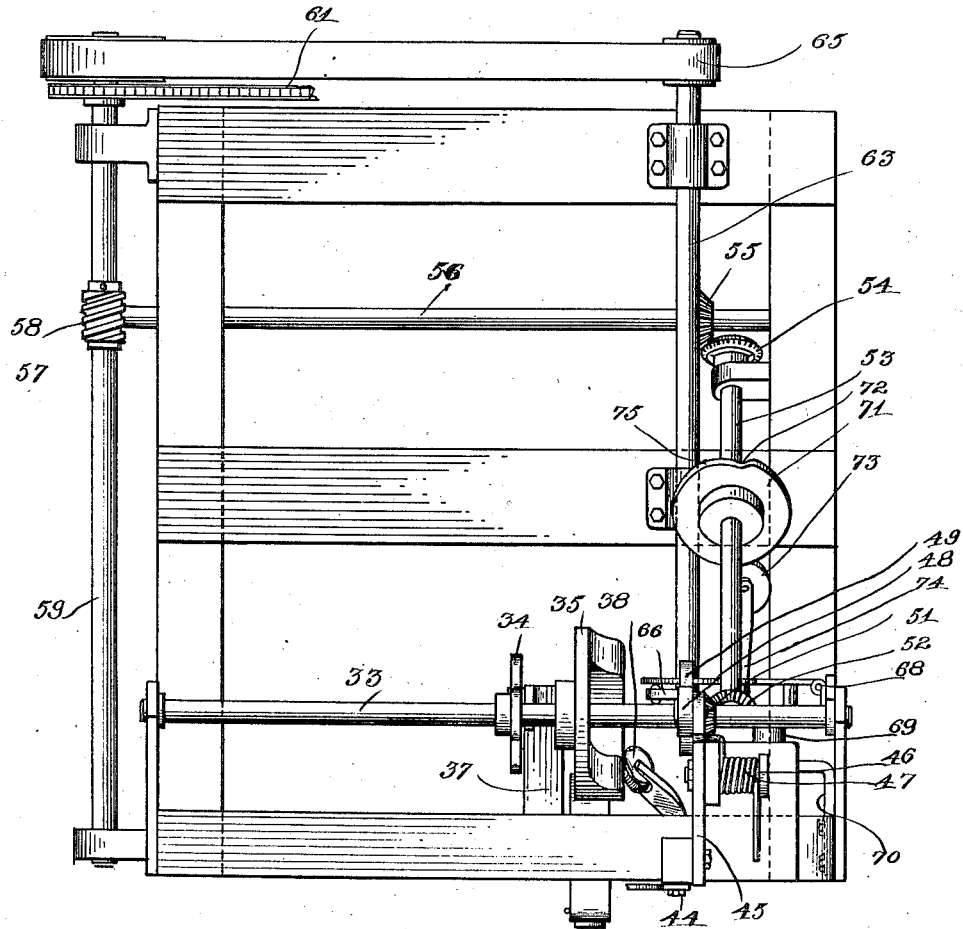
Fig 8 is a plan view of the machine with the paring machine removed.
Figure 9:
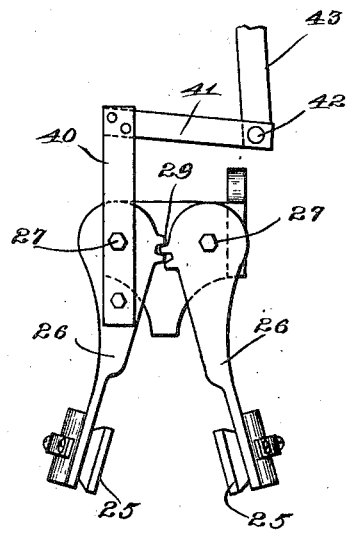
Fig. 9 is a detail view of the centering and holding means for the fruit.

There has been illustrated herein a paring machine of the type set forth in my Patent No. 1,168,788, granted January 18, 1916, but it will be understood that the invention is not limited to a paring machine of this type and in some respects is capable of use independently of a paring machine. A paring machine of the type illustrated is driven through power applied to the pulley 1 adapted through a clutch connection with the sprocket wheel 2 and a gear wheel 3 to drive the drum 4 which turns a reel 5 on which forks or supporting devices 6 for the fruit to be pared are mounted to be turned also through the drum, as, for instance, in the manner set forth in the hereinbefore mentioned patent. A carriage 7, driven by the follower 8 cooperating with the cam groove in the drum, is moved back and forth on the frame 9 on which the drum 4 and reel 5 are mounted to turn. This carriage carries the paring knife 10 which is pivoted at 11 to a swinging frame 12 and being held toward the fruit on the supporting fork or device 6 by a spring 13. The frame 12 carries a segmental gear 14 which is adapted to mesh with a gear 15 on the frame 9 so as to swing the swinging frame 12 back and forth as the carriage 7 is moved back and forth through the follower 8. The carriage 7 also has mounted thereon a coring device or spoon 16 which as the carriage moves in one direction enters the fruit of the rotating device 6 and causes the core to be cut from said fruit, the coring spoon or device being withdrawn from the fruit, as the carriage 7 moves in the opposite direction. No claim is made per se to any of the parts hereinbefore described. If the illustration or description thereof is insufficient, reference may be had to Patent No. 1,168,788, hereinbefore mentioned, where the parts are substantially the same.

In my hereinbefore mentioned patent, means was employed for insuring the removal of the cored apple from the fork or supporting device by means of the coring device, whereas in this invention it is desirable that the apple shall not be removed from the rotary supporting fork or device at this time and in order to prevent such removal through the frictional contact of the coring device with the fruit stripping device of my patent, hereinbefore mentioned, is eliminated and a corer stripping device 17 is employed in the form of a rigid arm projected upwardly from the base frame 18 on which the frame 9 is supported, and having the rotary supporting device 6 and the coring device 16 both movable relatively thereto. As the pared and cored apple remains on the rotary device and fork 6 during the movement of the coring device with the carriage 7 away from the fork, means is preferably provided which will prevent the knife of the mechanism from stripping the apple from the fork on the return movement of the carriage. In this instance, this means is brought into operation as the paring knife reaches to the end of its paring movement and comprises a means such as a detent 19 pivoted at 20 to the bracket 21 on which the rack 15 is formed rigid with the frame 9. A spring 22 tends to hold the detent in the position shown in Fig. 10, that is, in a position where the stem of the knife 10 may enter the notch 23 of the detent when the knife completes the paring action and starts to move with the carriage 7 toward the outer end of the supporting fork. As this movement continues the detent 19 swings about the pivot 20 and throws the knife head 10 away from the apple on the supporting fork so that the knife head clears the apple with the withdrawing of the supporting device 16. After the swinging frame 12 completes its swinging movement, the stem of the knife head is carried out of the notch 23 by the carriage 7 and the detent 19 swings back to its original position against the rubber bumper 24 under the action of the spring 22, where it is again in position to engage the stem of the knife when the latter starts on its return movement.

After the apple has been pared and cored it is carried by the reel 5 in the direction of the arrow, Fig. 2, so as to be presented to a mechanism which will, in this instance, remove the fruit from the fork on which it is pared and present such fruit to a seed cell removing device. This mechanism, in this instance, comprises a centering and holding means which grips the apple exteriorly, preferably being in the form of two cup shaped jaws 25, supported with their cup portions opposed to each other on arms 26 which are pivoted at 27 to a swinging arm 28, gear teeth 29 being provided on the arms 26 so that the two arms may move together toward and from each other. The arm 28 is mounted to move about two axes at right angles to each other. In this instance, the arm 28 is mounted to turn on a shaft 30 supported by a frame 31 which in turn is mounted to turn on a shaft 32.

Movement of the arm 28 about these two axes 30 and 32 is preferably effected through two separate mechanisms both, in this instance, being driven by a shaft 33 and comprising cams 34 and 35, the cam 34 cooperating with a roller 36 on an arm 37 to swing the arm 28 about the axis 32 and cam 35 cooperating with a roller 38 on the arm 28 to swing the latter about the axis 30, a spring 39 acting on the arm 28 to hold the roller 38 against the cam 35 and the roller 36 being held against its cam 34 by the weight of the arm 28 and the parts carried thereby. The cam 35 is so formed that it swings the arm 28 from the supporting fork to the seed cell remover or corer and back again, whereas the cam 34 is so formed that it operates at the ends of the movement effected by the cam 35 to swing the arm 28 toward and from the fork or supporting device 6 and also toward and from the seed cell corer or remover to be described. In other words, the cam 34 will move the arm 28 with the centering device 25 thereon away from a fork 6 to carry the apple or other fruit off the fork, then the cam 35 will operate to swing the arm 28 so as to present the centering device 25 with the apple held thereby opposite the seed cell corer. At this time, the cam 34 again acts to move the arm 28 with the holding and centering jaws 25 toward the seed cell corer, where they will hold the fruit during the removing of the seed cell thereof. After such removal of the seed cell, the cam 34 will again operate to swing the centering and holding jaws 25 away from the seed cell remover, when the jaws are opened in the manner to be described and are swung by the cam 35 to a position opposite one of the paring forks 6, the jaws being maintained opened during this movement. The cam 34 again comes into operation to move the jaws, while still open, on opposite sides of the fruit on a fork 6, and then the jaws are closed on the fruit, the operation hereinbefore described then being repeated.

The movement of the centering and holding jaws 25 is effected in any suitable manner, but, in this instance, an arm 40 is extended from one of the arms 26 and has an arm 41 extending therefrom. At 42 on this arm 41, a link 43 is pivoted, this link in turn being pivoted at 44 to a lever 45 which is mounted on a shaft 46. A spring 47 acts on said shaft to hold the roller 48 against a cam 49 on the shaft 33. This cam is so formed that it effects the opening and closing of the jaws, that is, it permits them to close quickly under the action of the spring 49 when the jaws have been positioned on opposite sides of an apple on one of the forks 6, as indicated in Fig. 2, and such cam causes the jaws to open, after the apple has had the seed cell removed by the said cell remover, permitting the apple to be discharged onto a chute 50 to be directed to any suitable place by said chute.

The shaft 33 which effects the movement of the jaws by the fork of the paring machine and seed cell remover and also effects the opening and the closing of said jaws may be driven in any suitable manner. In this instance, the shaft has a bevelled gear 51 thereon, which meshes with a bevelled gear 52, on the upper end of a shaft 53, said shaft 53 having at its lower end a bevelled gear 54 which meshes with a bevelled gear 55 on a shaft 56, also having a worm wheel 57 thereon which meshes with a worm 58 on a shaft 59, the latter having a sprocket wheel 60 thereon connecting by a sprocket chain 61 with the sprocket wheel 2, hereinbefore mentioned.

The seed cell remover or corer is preferably in the form of a curved knife 62 mounted to rotate with a shaft 63 and preferably pivoted on the shaft at 64 to turn about an axis and the axis of turning of the shaft so as to move toward and from the axis of rotation of the knife, the shaft 63 being driven from the shaft 59 preferably by a belt 65. The knife 62 enters the cored apple as the non-rotating supporting and centering cups present the apple or cored fruit to the knife or seed cell corer. With the end in view of swinging the knife 62 about the axis 64 on the shaft 63, operating means is employed embodying an arm 66 rigidly secured to the knife and engaged on opposite sides by two spaced parts 67 of a swinging member which is mounted on the main frame to swing on the axis 68. A spring or resilient device 69 is interposed between this swinging member and a bracket 70 on the main frame, this spring normally tending to move the knife outwardly to the position shown in Fig. 6, where it will, with the rotation of the shaft 63, remove the seed cell of the cored apple or other fruit.

In order to hold the knife blade 62 against swinging outwardly except as the apple or other fruit is presented to a seed cell corer and before it is again moved away by the jaws, a suitable mechanism may be employed preferably in the form of a rotary cam 71 arranged on the shaft 53 to turn therewith and having a notch or groove 72 in which a roller 73 on an arm 74 carried by the swinging member 67 is adapted to be received. The cam 71 has a surface 75 connecting with the depression 72 in such a manner that the knife 62 swings about the axis 64 gradually outward, until the depression 72 is reached after which the knife or seed cell remover is moved quickly to its position axially alined with the shaft 63, so that the apple may be readily withdrawn from the seed cell remover. By reason of this gradual outward movement of the cutter, the seed cell is removed in the form of a shaving which readily breaks up, and not in a large lump or piece, as it would if the knife moved quickly outward. It will be noted that the cups 25 are cut away at 25$^a$ so that there is no danger of the seed cell remover contacting with the cups at this point.

From the foregoing it will be seen that a seed cell remover has been combined with a paring machine in such a manner that the fruit, after being pared and cored may have the seed cell removed therefrom without any separate handling of the fruit. The means which removes the fruit from the paring machine carries the same on to the seed cell corer and holds such fruit against turning while the seed cell corer removes the seed cell. Provision is made whereby the coring devices do not remove the fruit from the rotary support or fork on which the fruit is pared and cored. Provision is also made whereby the usual paring knife is caused to swing away from the fruit or the rotary supporting knife or fork, as the paring knife makes its return movement to the position where it begins the paring operation. A rotary seed cell coring knife swings outwardly and inwardly in timed relation to the mechanism which feeds the same, so that there is no danger of the knife lying in the outward position as the fruit is presented thereto or removed therefrom. A seed cell removing apparatus is provided in which the fruit is held against turning with the seed cell removing device by mechanical means which holds the fruit, notwithstanding its size in proper centered relation to the seed cell removing device. A relative movement takes place between the seed cell removing device and the holdings and centering means to permit the holding and centering means to release the fruit after removing the cell and to cooperate with another fruit. A desirable form for the holding and centering means embodies relatively movable jaws which are so mounted that they may be moved bodily toward and from the seed cell removing device being held toward each other when supporting the fruit in operative relation with the seed cell removing device and being separated and closed, while shifted out of cooperation with the seed cell removing device. The seed cell removing device is mounted on a shaft and is movable outwardly and inwardly, the outward movement being gradual, so that the seed cell is removed in the form of a shaving and the inward movement being sudden after the seed cell has been removed, this preferably being effected by a cam.

What I claim as my invention and desire to secure by Letters Patent is:

1. In combination with a rotary seed cell removing device, of mechanical means for holding the fruit against turning and in centered relation to said seed cell removing device, said means comprising relatively movable jaws engaging about the fruit.

2. In combination with a rotary seed cell removing device, of mechanical means for holding the fruit against turning and in centered relation to said seed cell removing device, said means comprising a pair of cupped members, and pivoted supports for said members connected so as to move said members together toward each other or away from each other.

3. In combination with centering and holding jaws for fruit, a support on which said centering and holding jaws are movable, a rotary seed cell removing device, and mechanism for effecting a relative movement between the support and the rotary seed cell device in the direction of the axis of the latter in order to cause the rotary seed cell device to enter the fruit held by the jaws.

4. In combination with centering and holding jaws for fruit, a support on which said centering and holding jaws are movable, a rotary seed cell removing device, mechanism for effecting a relative movement between the support and the rotary seed cell device in the direction of the axis of the latter in order to cause the rotary seed cell device to enter the fruit held by the jaws, and means for effecting the movement of the rotary seed cell removing device with reference to its axis of turning, first outwardly, after the rotary seed cell device has been caused to enter the fruit, and then inwardly after the seed cell has been removed.

5. In combination with centering and holding jaws for fruit, a support on which said centering and holding jaws are movable, a rotary seed cell removing device, a shaft on which said rotary seed cell removing device is mounted to move outwardly with reference to the axis of turning of the shaft, mechanism for effecting the relative movement between the support and the shaft in the direction of the axis of the latter in order to cause the rotary seed cell device to enter the fruit held by the jaws, means for effecting the movement of the rotary seed cell removing device with reference to the axis of the shaft, first outwardly, after the rotary seed cell removing device has been caused to enter the fruit, and then inwardly after the seed cell removing device has passed from the fruit.

6. In combination with relatively movable jaws for holding fruit against turning, a rotary seed cell removing device, a shaft on which said rotary seed cell removing device is mounted, means for effecting relative movement between the shaft and the holding means in the direction of the axis of rotation of the shaft, and means for effecting the movement of the rotary seed cell removing device with reference to the axis of the rotation of the shaft, first outwardly after the rotary seed cell removing device has entered the fruit in the holding means, and then inwardly after the seed cell removing device has removed the seed cell to permit the relative axial movement between the shaft and the holding means in order to withdraw the seed cell removing device from the fruit held by the holding means.

7. In combination with a centering means for the fruit, a rotary seed cell removing device, and means for effecting the movement of said seed cell removing device first outwardly and gradually with reference to the axis of rotation and then suddenly inward.

8. In combination with a centering means for the fruit, a rotary seed cell removing device movable inwardly and outwardly with reference to its axis of rotation, and a cam arranged to effect the outward and inward movement while the seed cell removing device is rotating.

9. In combination with a suitable centering means for the fruit, a rotary shaft, a seed cell removing device turning with the shaft and adapted to move inwardly and outwardly with reference to the axis of rotation of the shaft, a member supported independently of the shaft and connected with the rotary seed cell device to effect the inward and outward movement with the member on the shaft, and a cam having connection with said member to effect the movement of the latter.

10. In combination with a suitable centering means for the fruit, a rotary shaft, a seed cell removing device turning with the shaft and adapted to move inwardly and outwardly with reference to the axis of rotation of the shaft, a member supported independently of the shaft and connected with the rotary seed cell device to effect the inward and outward movement with the member on the shaft, and a cam having connection with said member to effect the movement of the latter, said cam having a surface formed to move the seed cell removing device first gradually and outwardly and then suddenly and inwardly.

11. In combination with a suitable centering means for the fruit, a rotary shaft, a seed cell removing device pivotally mounted on the shaft to move inwardly and outwardly with reference to the axis of rotation of the shaft, a member pivotally mounted independently of the shaft and connected to the seed cell removing device to effect the movement of the latter inwardly and outwardly, a resilient means opposing the movement in an outward direction, a roller carried by the member, and a cam cooperating with the roller to effect the movement of the member in both directions.

12. The combination with a paring mechanism, a supporting device on which the fruit is pared by the paring mechanism, and a coring means for coring the fruit on the supporting device, of a seed cell removing device and mechanism for removing the fruit from the supporting device and presenting it properly centered to the seed cell removing device.

13. The combination with a paring mechanism, of a seed cell removing device, centering and holding jaws, and mechanism for effecting the movement of the centering and holding jaws for causing them to remove the fruit from the supporting device, and present the same to the seed cell removing device.

14. The combination with a paring mechanism and a supporting device on which the fruit is pared by the paring mechanism, of a seed cell removing device, centering and holding jaws, and mechanism for causing said jaws to close upon the fruit while it is upon the supporting device, remove the fruit from the supporting device, present the fruit to the seed cell removing device, and thereafter open to discharge the fruit.

15. The combination with a paring mechanism, a rotary reel and a plurality of supporting devices carried by the reel toward and from the paring mechanism, of means cooperating with said paring mechanism to cause it to swing out of the path of the fruit on one of the supporting devices, as the paring mechanism moves toward its starting position.

16. The combination with a paring mechanism, a rotary reel and a plurality of supporting devices carried by the reel toward and from the paring mechanism, of means cooperating with said paring mechanism to cause it to swing out of the path of the fruit on one of the supporting devices, as the paring mechanism moves toward its starting position, and mechanism for removing the fruit from a supporting device after the reel has moved away to carry the supporting device away from the position it occupies during the paring.

17. The combination with a main frame, a carriage movable on said main frame, a reel mounted to move on said main frame, and a plurality of supporting devices for supporting fruit, while it is being pared, of a paring mechanism carried by the carriage, and means mounted on the main frame for moving said paring mechanism so that it will clear the fruit on the supporting device as the carriage moves to carry the paring mechanism to starting position.

18. The combination with a main frame, a carriage movable on said main frame, a reel mounted to move on said main frame, a plurality of supporting devices for supporting fruit while it is being pared, of a swinging frame on the carriage connected with the main frame to be moved by the latter, a pivoted paring knife mounted on the swinging frame, and a swinging member mounted on the main frame and adapted to be engaged by the pivoted knife, when the swinging frame moves, to carry the knife to a position where it will clear the fruit on the supporting device.

19. The combination with a main frame, a carriage movable on said main frame, a reel mounted to move on said main frame, a plurality of supporting devices for supporting fruit while it is being pared, of a swinging frame on the carriage connected with the main frame to be moved by the latter, a pivoted paring knife mounted on the swinging frame, and a swinging member mounted on the main frame and adapted to be engaged by the pivoted knife, when the swinging frame moves, to carry the knife to a position where it will clear the fruit on the supporting device, and a spring for returning said swinging member to a position where it will be engaged by the paring knife after the paring knife has cleared the fruit on the supporting device.

20. The combination with a main frame, a carriage movable back and forth on the main frame, a reel mounted to turn on the main frame, a plurality of supporting devices carried by the reel, a swinging frame on the carriage connected with the main frame to be swung by the latter, and a knife pivotally mounted on the swinging frame, of means arranged to swing the knife on its pivot away from the pared fruit on one of the supporting devices on the movement of the carriage in the direction to carry the knife to the beginning of the paring movement.

21. The combination with a main frame, a carriage movable back and forth on the main frame, a reel mounted to turn on the main frame, a plurality of supporting devices carried by the reel, a swinging frame on the carriage connected with the main frame to be swung by the latter, and a knife pivotally mounted on the swinging frame, of means arranged to swing the knife on its pivot away from the pared fruit on one of the supporting devices on the movement of the carriage in the direction to carry the knife to the beginning of the paring movement, said means comprising a swinging member mounted on the main frame and provided with a notch in which the pivoted knife is adapted to be received on the return movement of the carriage, and a spring acting on said swinging member to return the latter to normal position, after such swinging member is released by the movement of the knife out of engagement therewith by the carriage.

22. The combination with a paring mechanism, a rotary reel, a plurality of supporting devices arranged on the reel and adapted to be carried successively to the paring mechanism to support the fruit during the paring, and a coring means cooperating with the fruit on the supporting device after the paring action, of mechanism for removing the fruit from the supporting devices of the reel after the reel is turned away from the paring mechanism, and means for cooperating with the fruit to prevent the withdrawal of the latter by the coring means, so that the fruit may be carried to said removing means.

23. The combination with a movable means having a plurality of supporting devices thereon for fruit, of a seed cell removing means, and mechanical means for removing the fruit from the supporting devices and presenting such fruit to the seed cell removing means to permit the seed cells to be removed from the fruit, while it is held by said mechanical means.

24. The combination with a movable means having a plurality of fruit supporting devices penetrating the fruit, of seed cell removing means for entering the fruit to remove the seed cell of the fruit, and mechanical means grasping the exterior of the fruit and movable to carry the fruit from the supporting devices to the seed cell removing means and to hold the fruit in centered relation to such seed cell removing means.

25. The combination with apple coring mechanism, of seed cell removing mechanism, and means acting automatically to transfer an apple from the coring mechanism to the seed cell removing mechanism.

26. The combination with an apple support, of a coring knife, seed cell removing mechanism, and means cooperating with the coring knife and acting to remove an apple from said support and transfer it to the seed cell removing mechanism.

27. The combination with a rotary fork and a paring mechanism associated therewith, of a fruit holder for cooperating with said fork mounted to swing in a relatively transverse plane into and out of alignment with the fork, and means for operating said fruit holder toward and from the fork.

28. The combination with a rotary fork and paring mechanism for cooperating therewith, of a fruit holder, means for operating said fruit holder to cause it to swing in a relatively transverse plane into and out of alignment with the fork, and means for operating said fruit holder toward and from the fork.

29. The combination with a rotary seed cell removing knife movable inwardly and outwardly with reference to the axis of turning of the knife, of a movable carrier having a fruit engaging device thereon, of centering and holding jaws movable to carry the fruit from the fruit engaging device on the movable carrier to the seed cell removing knife, spring means tending to hold said jaws towards each other, and means constructed to operate during the movement of the jaws away from the seed cell removing knife for effecting the opening of said jaws against the action of the spring means to release the seed celled fruit and to permit the jaws to engage the fruit on the fruit engaging device of the movable carrier.

30. The combination with a rotary seed cell removing knife movable inwardly and outwardly with reference to the axis of turning of the knife, of an intermittently movable carrier having fruit engaging devices thereon, of centering and holding jaws removing the fruit from the fruit holding devices of the intermittently movable carrier and presenting the same to the seed cell removing knife, spring means tending to hold said jaws towards each other, and means cooperating with said jaws during their movement away from the seed cell removing knife to effect the opening of the jaws against the action of their spring means to release the seed celled fruit and to permit the jaws to engage fruit on the intermittently movable carrier.

BURTON C. COONS.